(12) United States Patent
Alonzo et al.

(10) Patent No.: US 9,605,790 B1
(45) Date of Patent: Mar. 28, 2017

(54) UNIVERSAL SUPPORT STAND FOR PORTABLE ELECTRONIC DEVICES

(76) Inventors: Reynaldo V. Alonzo, Fresno, CA (US); Nina Seyedabadi, Fresno, CA (US)

( * ) Notice: Subject to any disclaimer, the term of this patent is extended or adjusted under 35 U.S.C. 154(b) by 0 days.

(21) Appl. No.: 13/358,382

(22) Filed: Jan. 25, 2012

(51) Int. Cl.
F16M 11/00 (2006.01)
F16M 13/00 (2006.01)
G06F 1/16 (2006.01)

(52) U.S. Cl.
CPC ............ *F16M 11/00* (2013.01); *F16M 13/00* (2013.01); *G06F 1/1626* (2013.01); *F16M 2200/08* (2013.01)

(58) Field of Classification Search
CPC . G06F 1/1626; G06F 1/1632; A47B 21/0314; A47B 2023/049; F16M 11/00; F16M 13/009; F16M 2200/08
USPC .. 248/473, 346.01, 346.03, 346.5, 912, 450, 248/176.1, 311.2, 441.1, 451, 452, 453, 248/454, 456, 460, 462, 465, 443, 488, 248/918; 211/41.1, 41.2, 41.3; 40/745, 40/764; 273/148 A, 150; D14/432, 434, D14/447; 361/679.56
See application file for complete search history.

(56) References Cited

U.S. PATENT DOCUMENTS

| | | | | |
|---|---|---|---|---|
| D39,646 S | * | 10/1908 | Willson et al. ................ | D19/75 |
| D70,914 S | * | 8/1926 | Salz .............................. | D19/79 |
| 2,018,271 A | * | 10/1935 | Lewis ........................... | 220/632 |
| 3,326,387 A | * | 6/1967 | Princevalle ................ | 211/41.11 |
| 3,361,131 A | * | 1/1968 | Barger ...................... | A61H 5/00 248/454 |
| D308,011 S | * | 5/1990 | Norris ......................... | D27/138 |
| D336,182 S | * | 6/1993 | Machut ........................ | D6/467 |
| 5,775,663 A | * | 7/1998 | Fitzsimmons et al. ....... | 248/450 |
| 5,860,559 A | * | 1/1999 | Wang ................ A47G 23/0208 220/632 |
| 5,927,674 A | * | 7/1999 | Snyder, Jr. .................... | 248/456 |
| D413,930 S | * | 9/1999 | Ancona et al. ............... | D19/90 |
| 6,142,315 A | * | 11/2000 | Arout ............................. | 211/45 |
| D454,703 S | * | 3/2002 | Doeing ......................... | D19/90 |
| D477,920 S | * | 8/2003 | McCarty ....................... | D6/310 |
| 6,854,730 B2 | * | 2/2005 | Braun ........................... | 273/150 |
| 7,025,312 B1 | * | 4/2006 | Dare ........................... | 248/176.1 |
| 7,342,162 B2 | * | 3/2008 | Tai ........................... | G10G 5/00 84/327 |
| D585,880 S | * | 2/2009 | Sade ........................... | D14/205 |
| 7,611,114 B1 | * | 11/2009 | Griffin ....................... | 248/311.2 |
| D618,985 S | * | 7/2010 | Sjoqvist ........................ | D8/356 |
| D628,203 S | * | 11/2010 | Noble ......................... | D14/447 |
| 7,969,732 B1 | * | 6/2011 | Noble ...................... | 361/679.56 |
| 7,992,831 B2 | * | 8/2011 | Fan ............................ | 248/205.5 |

(Continued)

*Primary Examiner* — Jonathan Liu
*Assistant Examiner* — Guang H Guan
(74) *Attorney, Agent, or Firm* — Kenneth L Tolar

(57) ABSTRACT

A support stand for portable electronic devices includes a substantially-circular base component having an upper surface, a lower surface and a continuous periphery surrounding a central aperture. Formed on the upper surface are a pair of transverse channels that are each substantially tangential to the central aperture. Within each channel are a plurality of substantially semi-cylindrical grooves, each having an imaginary bisector plane that is at a discrete, oblique angle relative to a vertical plane. Each channel includes an inclined inner wall that in combination with one of the grooves uprightly supports a portable electronic device at a distinct angle.

4 Claims, 3 Drawing Sheets

(56) References Cited

U.S. PATENT DOCUMENTS

| | | | |
|---|---|---|---|
| D666,204 S * | 8/2012 | Han | D14/447 |
| D668,662 S * | 10/2012 | Suiter | D14/447 |
| 8,282,054 B2 * | 10/2012 | Hayashi et al. | 248/176.1 |
| D671,546 S * | 11/2012 | Eberstein | D14/447 |
| D691,086 S * | 10/2013 | Custon | D13/108 |
| D696,260 S * | 12/2013 | Merea | D14/447 |
| D718,742 S * | 12/2014 | Warner | D14/217 |
| D730,090 S * | 5/2015 | Christal | D6/675.3 |
| D748,616 S * | 2/2016 | Noble | D14/253 |
| 2009/0179124 A1 * | 7/2009 | Caplan | 248/176.1 |
| 2013/0277529 A1 * | 10/2013 | Bolliger | F16M 11/10 248/676 |

* cited by examiner

UNIVERSAL SUPPORT STAND FOR PORTABLE ELECTRONIC DEVICES

CROSS REFERENCE TO RELATED APPLICATIONS

None.

BACKGROUND OF THE INVENTION

The present invention relates to a universal stand that can uprightly support various types of portable electronic devices at any one of a number of possible angles.

DESCRIPTION OF THE PRIOR ART

Electronic readers (e-readers), tablet computers, such as those marketed and sold under the trademark iPad™, wireless phones and other similar portable electronic devices are extremely popular. However, portable electronic devices are typically not equipped with integral support stands for raising the display screen to a more visible position. Accordingly, the user often holds the device upright, which is burdensome and inconvenient. Otherwise, the device is supported on the user's lap, a desk, a table, or another horizontal support surface where the device is cumbersome to operate and difficult to view.

Though a few aftermarket stands for uprightly supporting a designated electronic device exist in the prior art, they have several limitations. The angle of the electronic device sometimes must be adjusted to account for glare or changes in ambient lighting, to conceal the screen from those nearby or to satisfy the user's personal preference. However, few, if any, of the conventional aftermarket support stands are angularly adjustable.

Furthermore, phones, tablet computers and other electronic devices vary in size, shape, configuration and dimension. Therefore, each type of electronic device requires a designated, specifically-configured support stand that would be unsuitable for any other type of electronic device.

Accordingly, there is currently a need for a stand that can uprightly support a variety of electronic devices at a desired orientation. The present invention addresses this need by providing a stand formed of a circular base component having a plurality of varying sized and oriented grooves for receiving a select electronic device. Each groove in combination with a sloped inner wall uprightly supports virtually any type of electronic device at a distinct angle relative to an underlying surface.

SUMMARY OF THE INVENTION

The present invention relates to a support stand for portable electronic devices comprising a substantially-circular base component having an upper surface, a lower surface and a continuous periphery surrounding a central aperture. Formed on the upper surface are a pair of transverse channels that are each substantially tangential to the central aperture. Within each channel are a plurality of substantially semi-cylindrical grooves, each having an imaginary bisector plane that is at a discrete, oblique angle relative to a vertical plane. Each channel includes an inclined inner wall that in combination with one of the grooves uprightly supports a portable electronic device at a distinct angle.

It is therefore an object of the present invention to provide a stand that is adapted to support multiple electronic devices at various angles.

It is another object of the present invention to provide a universal support stand that is aesthetically unique.

It is yet another object of the present invention to provide a universal support stand that is easily transported and stored.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
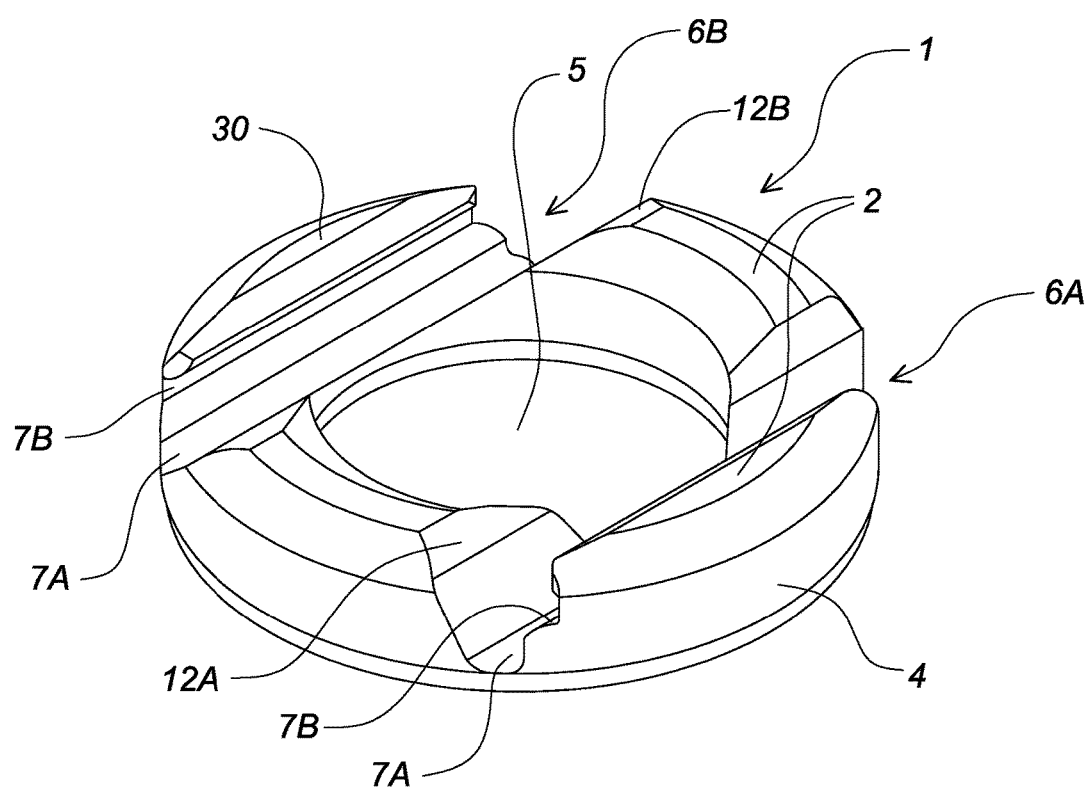
FIG. 1 is a perspective view of the support stand according to the present invention.
Figure 2:
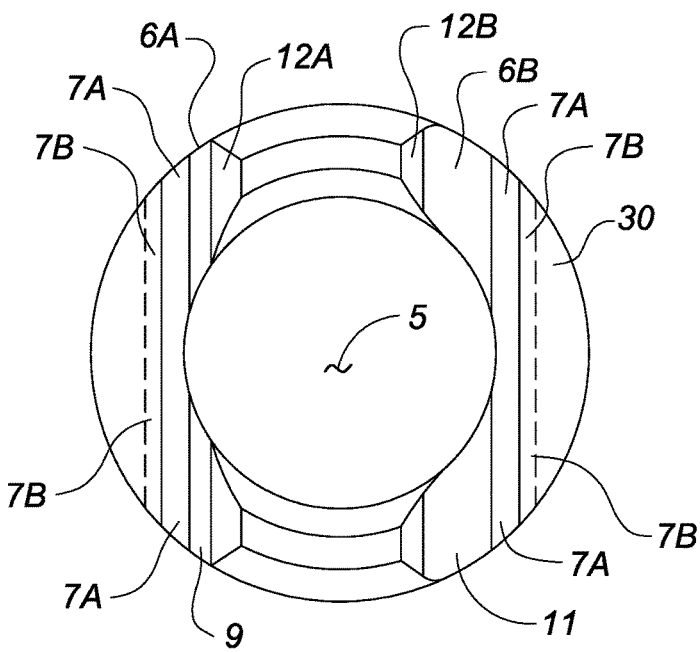
FIG. 2 is a top view of the support stand.
Figure 3:
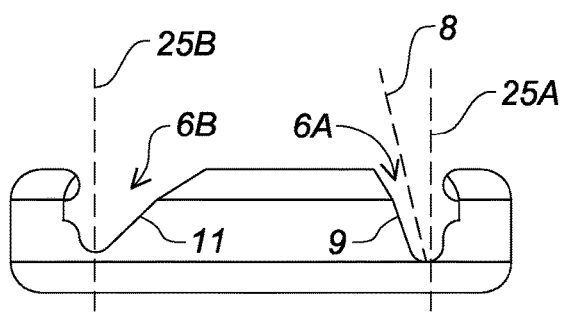
FIG. 3 is a side view of the support stand.
Figure 4:
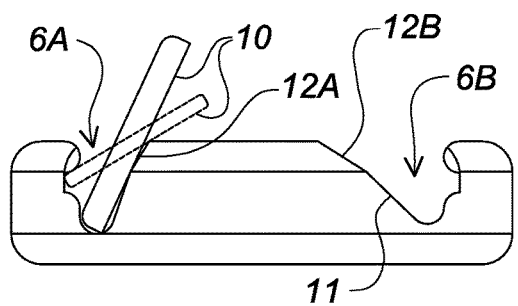
FIG. 4 depicts the support stand from a side opposite that of FIG. 3.
Figure 5:
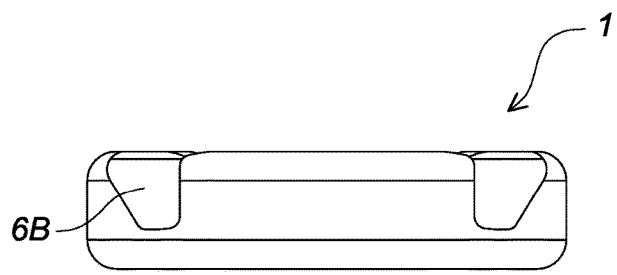
FIG. 5 is a front view of the support stand.
Figure 6:
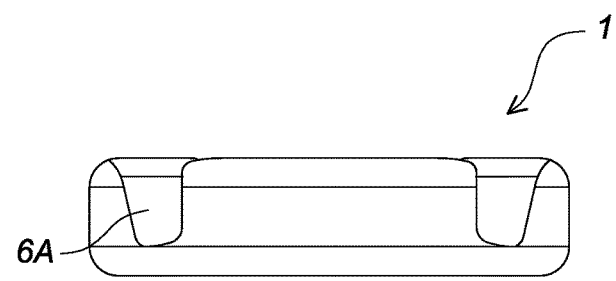
FIG. 6 is a rear view of the support stand.
Figure 7:
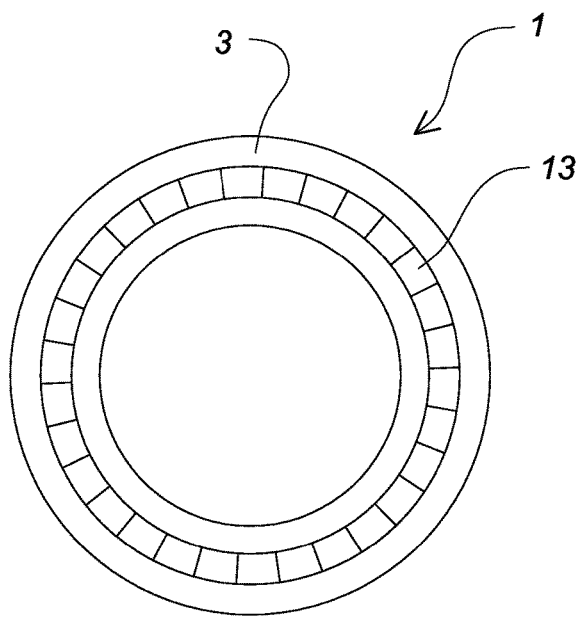
FIG. 7 is a bottom view of the support stand.

The present invention relates to a support stand for portable electronic devices comprising a substantially-circular, symmetrical base component 1 having an upper surface 2, a lower surface 3 and a continuous periphery 4 surrounding a central aperture 5. Formed on the upper surface are a pair of opposing, transverse channels 6A, 6B that are each substantially tangential to the central aperture. Within each channel are a plurality of grooves 7A, 7B, each having a select dimension and angular orientation for receiving the lower edge of a portable electronic device. Each groove is substantially semi-cylindrical having an imaginary bisector plane 8 that is at a discrete, oblique angle ∝ relative to a vertical plane 25A, 25B.

One 6A of the channels includes a sharply-inclined inner wall 9 for uprightly supporting a larger electronic device 10, such as that marketed and sold under the trademark iPad™. The opposing channel 6B may have a gradually-inclining inner wall 11 to support the electronic device closer to a horizontal plane as opposed to the other inner wall 9. The juxtaposed, angularly-varied grooves in combination with either inner wall allow the electronic device to be uprightly supported at any one of several distinct angles.

Angularly extending from the upper end of each inner wall is a platform 12A, 12B on which an electronic device rests when supported in a more horizontal position, or if the inclined inner wall is unsuitable. Adjacent each channel, on a side opposite the inner wall, is a ledge 30 that retains an electronic device in a substantially-horizontal position when placed in an uppermost groove. A ring 13 of slip-resistant material is disposed on the bottom surface of the base component for frictionally engaging an underlying object.

As is readily apparent from the detailed description set forth above, virtually any portable electronic device may be uprightly supported at a desired angle by using any one of the grooves in combination with one of the inner walls, ledges or platforms. Furthermore, the large, central aperture significantly reduces the necessary materials of construction to form a lightweight stand that is easily transported and stored. However, the low-profile, symmetrical design of the base component provides a ballasting effect when an electronic device is uprightly supported therein.

The above-described device is not limited to the exact details of construction and enumeration of parts provided herein. For example, though the grooves are primarily depicted and described as being semi-cylindrical, any other shape that achieves the results described herein may also be used. Furthermore, the size, shape and materials of construction of the various other components can also be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A universal support stand for a portable electronic device, the universal support stand comprising:
    a base component having an upper surface, a lower surface, a periphery and a central aperture, said central aperture having a first portion and a second portion opposing the first portion;
    a first channel formed on the upper surface of said base component, said first channel intersecting said first portion of said central aperture, said first channel having a plurality of grooves therein, said plurality of grooves in said first channel having at least a first groove and a second groove, each of said first and second grooves in said first channel dimensioned and configured to receive an edge of the portable electronic device to uprightly support said portable electronic device within said first channel, wherein each of said first and second grooves in said first channel is configured to allow the portable electronic device to be positioned and tilted toward the central aperture at a distinct angle relative to a first vertical plane, said first channel further including an inner wall inclined inwardly toward said central aperture for uprightly supporting the portable electronic device when positioned within said first groove in said first channel in a first position;
    a second channel formed on the upper surface of said base component, said second channel intersecting said second portion of said central aperture, said second channel having a plurality of grooves therein, said plurality of grooves in said second channel having at least a first groove and a second groove, each of said first and second grooves in said second channel dimensioned and configured to receive the edge of the portable electronic device to uprightly support said portable electronic device within said second channel, wherein each of said first and second grooves in said second channel is configured to allow the portable electronic device to be positioned and tilted toward the central aperture at a distinct angle relative to a second vertical plane, said second channel further including an inner wall inclined inwardly toward said central aperture for uprightly supporting the portable electronic device when positioned within said first groove in said second channel in a second position, wherein the inner wall of said second channel is inclined more sharply than the inner wall of said first channel;
    a first platform angularly extending from an upper end of the inner wall of said first channel for supporting the portable electronic device within said second groove in said first channel in a position more horizontal than said first position;
    a second platform angularly extending from an upper end of the inner wall of said second channel for supporting the portable electronic device within said second groove in said second channel in a position more horizontal than said second position.

2. The universal support stand according to claim 1 wherein said base component is low-profile and symmetrical to provide a ballasting effect to uprightly support the portable electronic device.

3. The universal support stand according to claim 1 wherein said base component is substantially circular.

4. The universal support stand according to claim 1 further comprising a ring of slip-resistant material disposed on the lower surface of said base component for frictionally engaging an underlying object.

* * * * *